(12) United States Patent
Kobashi et al.

(10) Patent No.: US 9,256,112 B2
(45) Date of Patent: Feb. 9, 2016

(54) ELECTRONIC PAPER AND METHOD FOR MANUFACTURING THE SAME

(71) Applicant: TOPPAN PRINTING CO., LTD., Tokyo (JP)

(72) Inventors: Yasuhiro Kobashi, Tokyo (JP); Kodai Konno, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 14/229,359

(22) Filed: Mar. 28, 2014

(65) Prior Publication Data

US 2014/0211297 A1    Jul. 31, 2014

Related U.S. Application Data

(63) Continuation of application No. PCT/JP2012/074202, filed on Sep. 21, 2012.

(30) Foreign Application Priority Data

Sep. 28, 2011  (JP) ................................ 2011-212535

(51) Int. Cl.
```
G02B 26/00    (2006.01)
G09G 3/34     (2006.01)
G02F 1/167    (2006.01)
G02F 1/1335   (2006.01)
```
(52) U.S. Cl.
CPC .......... *G02F 1/167* (2013.01); *G02F 1/133516* (2013.01); *G02F 2001/1678* (2013.01)

(58) Field of Classification Search
CPC .................. G02B 26/026; G02F 1/167; G02F 2001/1678; G09G 3/344; G09F 9/372
USPC .............. 359/296; 345/107; 430/32; 204/600
See application file for complete search history.

(56) References Cited

U.S. PATENT DOCUMENTS

2005/0193906 A1    9/2005    Nakamura et al.
2008/0317943 A1    12/2008   Hirai

FOREIGN PATENT DOCUMENTS

| CN | 1725044 | 1/2006 |
|---|---|---|
| CN | 1324096 | 7/2007 |

(Continued)

OTHER PUBLICATIONS

International Search Report mailed Oct. 16, 2012 in corresponding International Patent Application No. PCT/JP2012/074202.

(Continued)

*Primary Examiner* — William Choi (57) ABSTRACT

Electronic paper whose coloring rate in a pixel is improved by preventing color mixing between pixels and a method for manufacturing the electronic paper are provided. Electronic paper in which an electrophoretic material layer 4, an optically transparent electrode layer 5, an ink fixing layer 7, and a color filter layer 8 created by printing pixel ink by an inkjet method are stacked on an electrode substrate in this order, wherein a repellent component, for example, a monomer containing fluorine or a polymer containing fluorine, or more specifically aliphatic polycarbonate containing fluorine is added to the pixel ink.

13 Claims, 6 Drawing Sheets

(56) References Cited

FOREIGN PATENT DOCUMENTS

| | | | |
|---|---|---|---|
| JP | 2001-74929 | | 3/2001 |
| JP | 2003-107234 | | 4/2003 |
| JP | 2003-295235 | | 10/2003 |
| JP | 2007-298632 | | 11/2007 |
| JP | 2007298632 A | * | 11/2007 |
| JP | 2009-600 | | 1/2009 |
| JP | 2009-282064 | | 12/2009 |
| JP | 2010-18653 | | 1/2010 |
| JP | 2010-503895 | | 2/2010 |
| JP | 4568429 | | 8/2010 |
| TW | 201022737 | | 6/2010 |

OTHER PUBLICATIONS

PCT International Preliminary. Report on Patentability mailed Apr. 10, 2014 in corresponding International Application No. PCT/JP2012/074202.

Taiwanese Office Action mailed Aug. 28, 2014 in corresponding Taiwanese Patent Application No. 101135455.

Korean Office Action dated Feb. 23, 2015 in corresponding Korean Patent Application No. 10-2014-7011042.

Extended European Search Report dated Jun. 12, 2015 in corresponding European Patent Application No. 12836480.9.

Korean Office Action dated Oct. 27, 2015 in corresponding Korean Patent Application No. 10-2014-7011042, 10 pages.

Chinese Office Action dated Nov. 3, 2015 in corresponding Chinese Patent Application No. 201280046157.7, 17 pages.

* cited by examiner

FIG. 6

ELECTRONIC PAPER AND METHOD FOR MANUFACTURING THE SAME

CROSS-REFERENCE TO RELATED APPLICATIONS

This application is a Continuation Application of PCT Application No. PCT/JP2012/074202, filed Sep. 21, 2012 and based upon and claiming the benefit of priority from prior Japanese Patent Application No. 2011-212535, filed Sep. 28, 2011, the entire contents of all of which are incorporated herein by reference.

TECHNICAL FIELD

Embodiments described herein relate generally to electronic paper and a method for manufacturing the electronic paper.

BACKGROUND ART

With increasingly widespread use of electronic information networks, electronic publishing including electronic books is also used more widely. As an apparatus for electronic publishing and caused to display electronic data, a self-luminous or back-light display apparatus is used. However, when compared with printed paper as a medium, such a display apparatus is likely to cause fatigue when used for a long time for ergonomic reasons. In addition, power consumption thereof is heavy and when battery powered, the display time is limited. In contrast to such shortcomings, a reflection type display apparatus including electronic paper can reduce fatigue because characters can be read something like paper. In addition, display performance can be delivered outdoors in places where the sun or a light shines and so the reflection type display apparatus is also suitable for outdoor signboards. Moreover, the reflection type display apparatus can be powered for a long time because power consumption thereof is small. No power is consumed except when the screen is rewritten and therefore, electronic paper is also used for applications such as electronic signboards and electronic price tags and is actively developed.

The monochrome display is sufficient for only character information of an electronic book in electronic paper, but the colorized display is a technology necessary to display for illustrations of books, advertisements, signboards, the display to enhance the eye catch effect, images, catalogs and the like and needs thereof increase with the colorization of display content. Therefore, the following methods are proposed for color electronic paper.

For the colorization of electronic paper, a technique of using a plurality of microcapsules displaying R, G, and B in which electrophoretic particles are dispersed and sealed is proposed (Japanese Patent No. 4568429 and Japanese Patent No. 4207448).

For the colorization of electronic paper, a method of using a color filter is proposed. According to the method, the interval between pixels of the color filter is preferably 1 to 20 μm (Japanese Patent No. 4415525).

For the colorization of electronic paper, a method of inkjet-printing a colored region on various surfaces of an electro-optical display or corresponding surfaces of a front plane laminate, reverse front plane laminate, or double release film used to manufacture such a display is proposed (Jpn. PCT National Publication No. 2010-503895).

For the colorization of electronic paper, a method of producing a color filter layer by printing according to the inkjet method by fitting to a pattern displayed in a monochrome display is proposed.

SUMMARY OF INVENTION

Technical Problem

In the method described in Patent Literatures 1, 2, it is difficult to arrange different types of microcapsules in respective electrode areas corresponding to R, G, and B with precision. In addition, if pigments are contained in the microcapsule, there is a problem of lowering the reflectance because the microcapsule is spherical and the surface reflection is not uniform.

In the method described in Patent Literature 3, it is difficult to achieve a high-contrast display unless the shift amount is less than 5 μm in a process of pasting a color filter substrate and an electrode substrate and there is a problem of difficulty of pasting the substrates with precision even by using the latest technology.

Thus, a method of making alignment unnecessary by doing color printing directly on electronic paper by the inkjet method to eliminate the process of pasting a color filter substrate and an electrode substrate is proposed. The inkjet method is noncontact printing and produces less foreign matter and, when compared with printing using a plate, the cost can advantageously be reduced thanks to non-plate printing.

In the method described in Patent Literature 4, a method of inkjet-printing a colored region on various surfaces of an electro-optical display or corresponding surfaces of a front plane laminate, reverse front plane laminate, or double release film used to manufacture such a display is proposed. Because droplets are spherical in the inkjet method, it is impossible to produce a pixel in a quadrangular shape fitting to a pixel in a plane. No mention is made of the coloring rate in the patent. There is no bank between pixels and color mixing occurs when color-printed pixels come into contact, causing a problem that the coloring rate in pixels cannot be raised.

When colored pixels are produced by inkjet printing, if there is no bank partitioning grid-like pixels, color mixing occurs when color printed pixels come into contact, causing a problem that the coloring rate in pixels cannot be raised. If a bank is used, a problem of the decreased reflectance due to the area of a bank portion is caused. If an optically transparent bank is used, a process to produce the bank is further added, alignment precision to produce the bank is needed, and the bank needs to be produced thin, causing a problem of increased costs.

When color reproducibility is achieved, if the coloring rate in pixels is low, it is necessary to increase the concentration of ink or the film thickness, which decreases permeability of ink and the reflectance, but by raising the coloring rate in pixels, the concentration of ink or the film thickness can be lowered so that permeability of ink can be increased. That is, by raising the coloring rate in pixels, the reflectance and color reproducibility, which are challenges of color electronic paper, can be delivered to the utmost. However, if the pixel size is simply increased, color mixing occurs due to overlapping pixels. That is, to raise the coloring rate in pixels, bringing the pixel shape closer to a quadrangular shape, improving coating precision, and preventing color mixing are main challenges.

An object of the present invention is to provide electronic paper that prevents color mixing between pixels and whose coloring rate in pixels is improved and a method for manufacturing the electronic paper.

Solution to Problem

An invention described in claim 1 is electronic paper in which an electrophoretic material layer, an optically transparent electrode layer, an ink fixing layer, and a color filter layer created by printing pixel ink on the ink fixing layer are stacked on an electrode substrate in this order, wherein a repellent component is added to the pixel ink.

An invention described in claim 2 is the electronic paper according to claim 1, wherein the color filter layer is formed by printing the pixel ink on the ink fixing layer by an inkjet method.

An invention described in claim 3 is the electronic paper according to claim 1 or 2, wherein the repellent component is a monomer containing fluorine or a polymer containing fluorine.

An invention described in claim 4 is the electronic paper according to claim 3, wherein the repellent component is aliphatic polycarbonate containing fluorine.

An invention described in claim 5 is the electronic paper according to one of claims 1 to 4, wherein an interval between neighboring printed pixels printed on the ink fixing layer is 1 μm or more and 10 μm or less.

An invention described in claim 6 is the electronic paper according to one of claims 1 to 5, wherein a coloring rate in a pixel of the printed pixel is 60% or more and 99% or less.

An invention described in claim 7 is a method for manufacturing electronic paper, comprising: stacking an electrophoretic material layer, an optically transparent electrode layer, and an ink fixing layer on an electrode substrate in this order; and printing pixel ink on the ink fixing layer by an inkjet method to form a color filter layer, wherein a repellent component is added to the pixel ink.

Advantageous Effects of Invention

According to the present invention, neighboring ink colored regions do not mix with each other and therefore, color electronic paper whose coloring rate in pixels is high can be produced.

DESCRIPTION OF EMBODIMENTS

Embodiments of the present invention will be described below.

Electronic paper in the present invention (hereinafter, referred to as color electronic paper) is produced by adding a color printing process by the inkjet method to a production process of conventional monochrome electronic paper.

As a method of producing an electrophoretic display apparatus generally called electronic paper, for example, an electrophoretic display apparatus described in Jpn. Pat. Appln. KOKAI Publication No. 1-86116 that makes a required display by sealing a dispersed system containing electrophoretic particles between counter electrode plates, at least one of which is optically transparent, and changing optical reflectance properties by a display control voltage applied to between the electrodes is cited.

Figure 1:
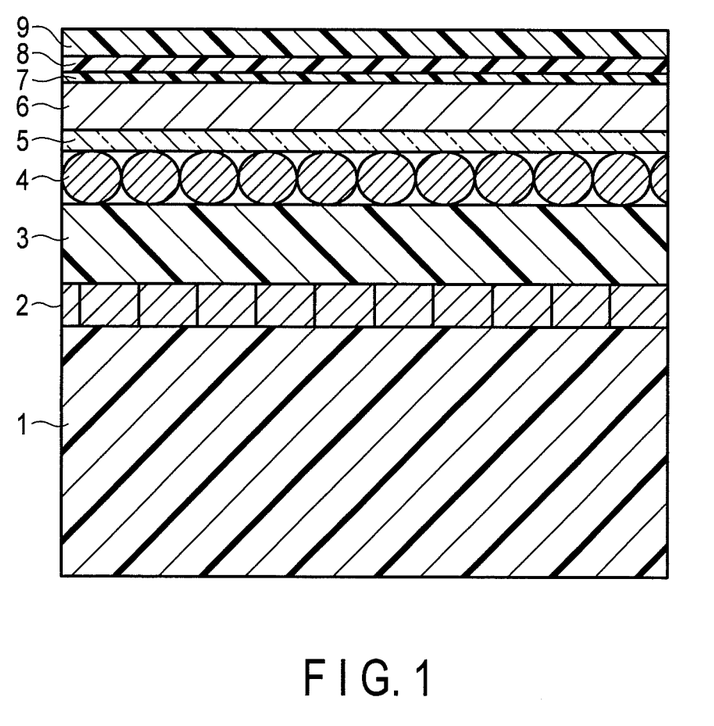
FIG. 1 is a sectional view illustrating the configuration of layers of electronic paper according to an embodiment of the present invention.

In color electronic paper in the present invention, an ink fixing layer is added onto an electrode layer of monochrome electronic paper to form a color filter layer by the inkjet method. FIG. 1 is a sectional view illustrating the configuration of layers of electronic paper according to an embodiment of the present invention. In FIG. 1, color electronic paper has an electrophoretic material layer 4, an optically transparent electrode layer 5, an ink fixing layer 7, and a color filter layer 8 obtained by printing pixel ink by the inkjet method stacked in this order on an electrode substrate formed from a substrate layer 1 and an electrode layer 2. Incidentally, reference numeral 3 is a bonding layer, reference numeral 6 is an electrode sheet layer, and reference numeral 9 is a protective film.

As the ink fixing layer, for example, an inkjet recording medium described in Jpn. Pat. Appln. KOKAI Publication No. 2000-43405 or, for example, an inkjet printer recording medium described in Jpn. Pat. Appln. KOKAI Publication No. 2008-272972 can be used. Particularly, an ink fixing layer of high transparency is preferable. However, it is not preferable to use an inkjet image reception material in a porous structure as described in Jpn. Pat. Appln. KOKAI Publication No. 2000-238408 as the ink fixing layer in the present invention. This is because if the porous structure is adopted for the ink fixing layer, the layer is impregnated with ink, which damages ink repellency. That is, the ink fixing layer is required to be a film holding type. Materials of the ink fixing layer are required to have performance such as being transparent and free from discoloration and fading of image received ink and having various kinds of resistance and vinyl resin such as polyvinyl butyral and polyvinyl acetate is used as a desired material.

A coating of the ink fixing layer material is applied by a coating apparatus such that the thickness thereof after drying is 3 to 10 μm. As the coating apparatus, a die coater, a spin coater, a bar coater or the like is used for coating. However, the coating method is not limited to methods thereof.

After the coating of the ink fixing layer material, the material is set by one of the methods of heat, vacuum, UV irradiation and the like to form an ink fixing layer.

A coating of any pattern is applied by fitting to the electrode substrate in which electrode wiring is patterned by the inkjet method.

Next, an embodiment of an inkjet apparatus used for the present invention will be described using drawings.

Figure 2:
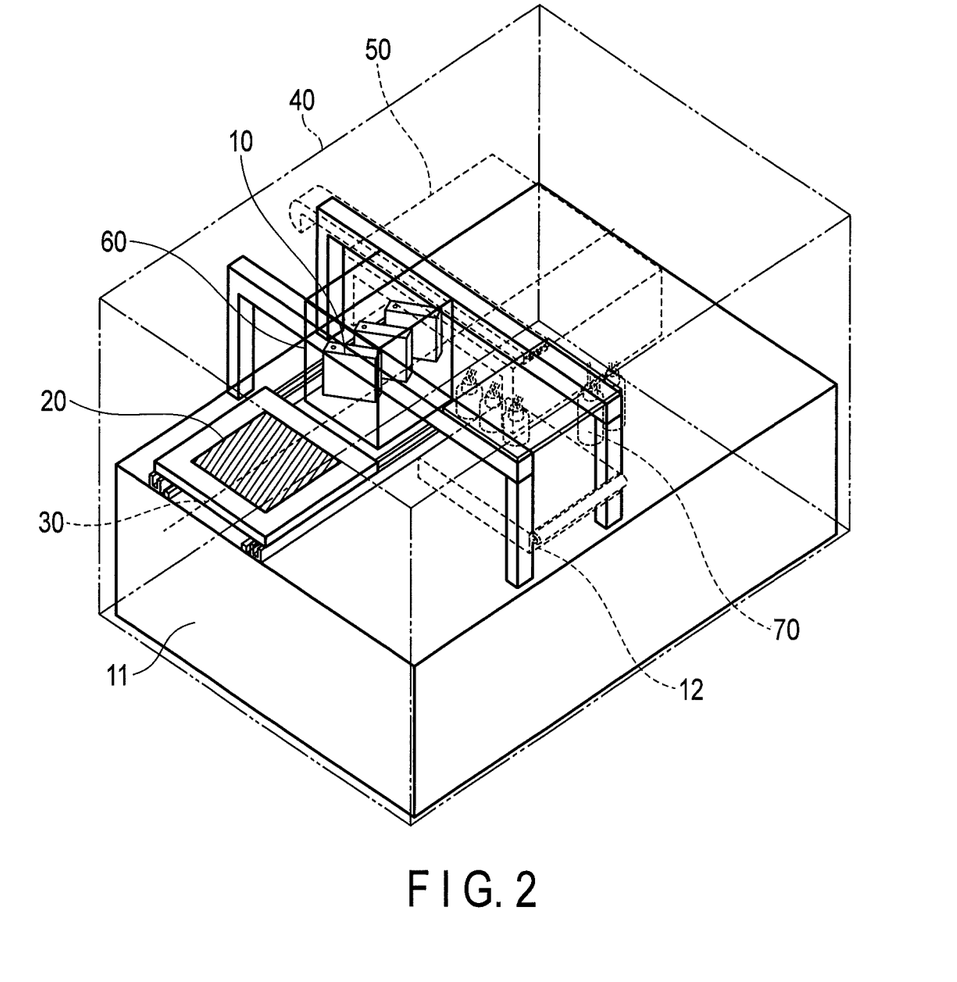
FIG. 2 is a diagram illustrating an inkjet coating apparatus.

FIG. 2 shows an explanatory view of an inkjet coating apparatus in a method for manufacturing color electronic paper in the present invention. As the apparatus configuration of a coating apparatus 40, a transport stage 30 that transports a color electronic paper substrate 20 put thereon in one direction with high precision, an inkjet head 10 to which inkjet ink with which the color electronic paper is coated is supplied, and an inkjet head unit 60 that holds the inkjet head 10 in a constant height from the color electronic paper substrate (hereinafter, referred to simply as the substrate) and is capable of a perpendicular slip in the transport direction are included. The inkjet head includes a plurality of nozzles that eject ink and these nozzles are arranged at predetermined equal intervals in a scanning direction in which the inkjet head is relatively scanned with respect to a colored pixel pattern (hereinafter, referred to simply as the pixel pattern) of the color filter layer. Further, an inkjet head control base 11 to control the ejection of inkjet ink from the nozzles of the inkjet head 10 is included. By setting the distance from the inkjet head nozzles to the substrate to 300 μm to 2000 μm, a coating can be applied with high precision of coating. If the distance is 300 μm or less, the danger of contact of the inkjet head and the substrate increases and if the distance is 2000 μm or more, a misdirection is more likely to occur. In addition, an inkjet head maintenance apparatus 12 to restore ejection properties of the nozzles of the inkjet head is included. The inkjet head maintenance apparatus 12 includes a pot to perform wiping of the nozzle surface using waste, films or the like and to discharge a liquid and can use the maintenance mechanism of a general inkjet head. An alignment camera and an image processing unit are preferably included to position a pixel pattern of the color electronic paper. Incidentally, reference numeral 50 is a drying unit and reference numeral 70 is an ink tank.

In the present invention, the inkjet coating apparatus shown in FIG. 2 is used, the pixel pattern is relatively scanned by the inkjet head including the plurality of nozzles, and inkjet ink is ejected and supplied to the surface provided with the ink fixing layer of the substrate to form an inkjet ink layer, that is, a color filter layer on the ink fixing layer. In the present invention, the pixel pattern is relatively scanned by the inkjet head including the plurality of nozzles. The target of scanning may be the substrate side or the inkjet head side. Alternatively, both of the substrate and the inkjet head may be operated.

Figure 3:
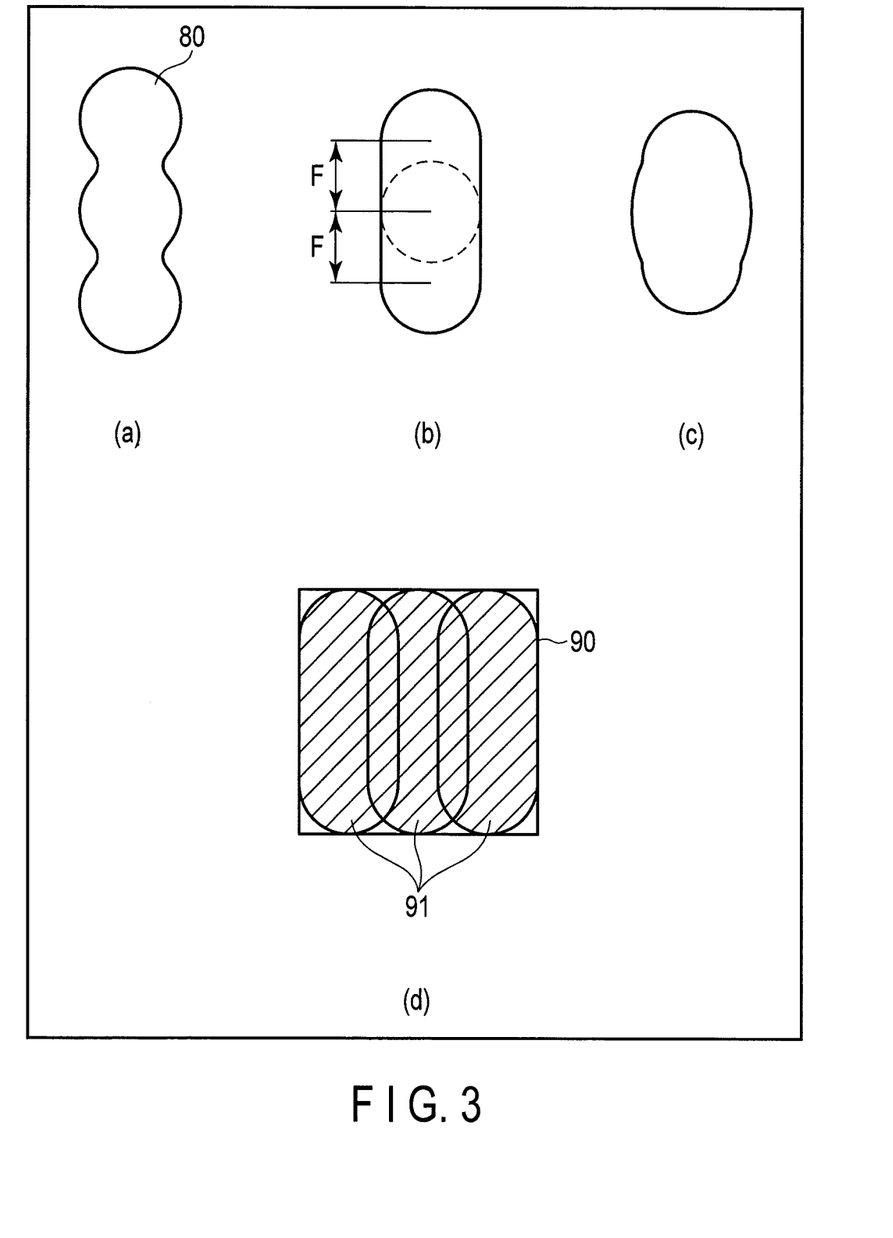
FIG. 3 is an explanatory view of pixel shapes and ejection arrangement patterns.

In the pixel formation of the present invention, it is preferable to arrange inkjet ejection in accordance with the size of the pixel. That is, it is preferable to produce a pattern in higher resolution from the pixel size and the relationship between droplets and the impact area. FIG. 3 shows an explanatory view of pixel shapes and ejection arrangement patterns. An ink droplet impact portion 80 is continuously ejected to produce a pixel in a long hole shape. In this case, if an interval F between ink droplets is long, a dented shape is formed (a) and if the interval is short, a shape in which the center portion is swelled is formed (c) and thus, it is preferable to produce a shape having a vertical straight line by adjusting the droplet diameter and the interval F (b). Further, a shape in which as many long hole shapes as desired are arranged horizontally is created to form a predetermined pixel colored portion 90 (d). Incidentally, reference numeral 91 is a pixel colored region.

Figure 5:
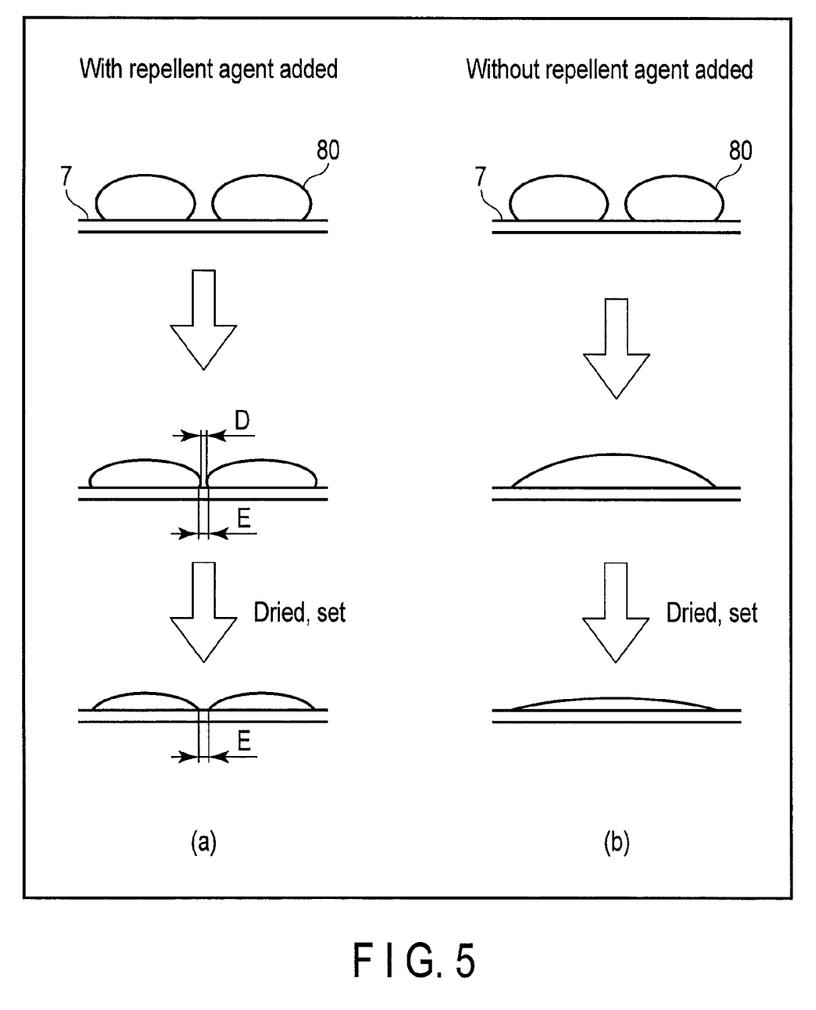
FIG. 5 is an explanatory view when droplets form pixels.

FIG. 5 shows an explanatory view when droplets form pixels. When the droplet 80 impacts the ink fixing layer 7, a wetted spread arises. By adding 0.01 to 3.00 (% by weight) of a repellent component (repellent agent) to inkjet ink when the wetted spread arises, an interface is generated between droplets of pixels and ink droplets are maintained with an interval D therebetween. Then, pixels are formed with an interval E therebetween from the wetted spread on the ink fixing layer 7 surface (FIG. 5A). However, if ink containing no repellent agent is used, as shown in FIG. 5B, color mixing occurs. If the interval E between neighboring printed pixels printed on the ink fixing layer 7 exceeds 10 μm, an interface between droplets due to the repellency effect may not be generated, which makes it impossible to deliver the effect of the present invention. It is also impossible to set the interval between pixels to less than 1 μm due to the interface and therefore, it is preferable to set the interval between printed pixels to be colored to 1 μm or more and 10 μm or less.

The relationship between the interval between pixels and a coloring occupancy rate will be described. When printed, for example, in a pixel size of 85 μm per side (300 dpi), if the interval E between pixels is assumed to be 10 μm, the pixel size is 85 μm per side if the impact precision of the inkjet apparatus is ±10 μm. In this case, the coloring occupancy rate is about 60%. When printed in a pixel size of 200 μm per side and the interval between pixels is set to 1 μm, the coloring occupancy rate is about 99%. When the mainstream pixel size of 85 to 200 μm is applied as the pixel size of the electronic paper, the coloring rate in pixels in the present invention is achieved in the range of 60% and 99%.

In the method for manufacturing the present invention, it is preferable to eject and supply inkjet ink to the pixel pattern by arranging the orientation of the inkjet head such that a component perpendicular to the main scanning direction of the inkjet head of distances of neighboring nozzles of the inkjet head is 1/integer a component perpendicular to the main scanning direction of the inkjet head of distances of neighboring pixels forming the same color of the color electronic paper. When the orientation of the inkjet head is arranged, it is preferable to tilt the inkjet head with respect to the main scanning direction.

Figure 4:
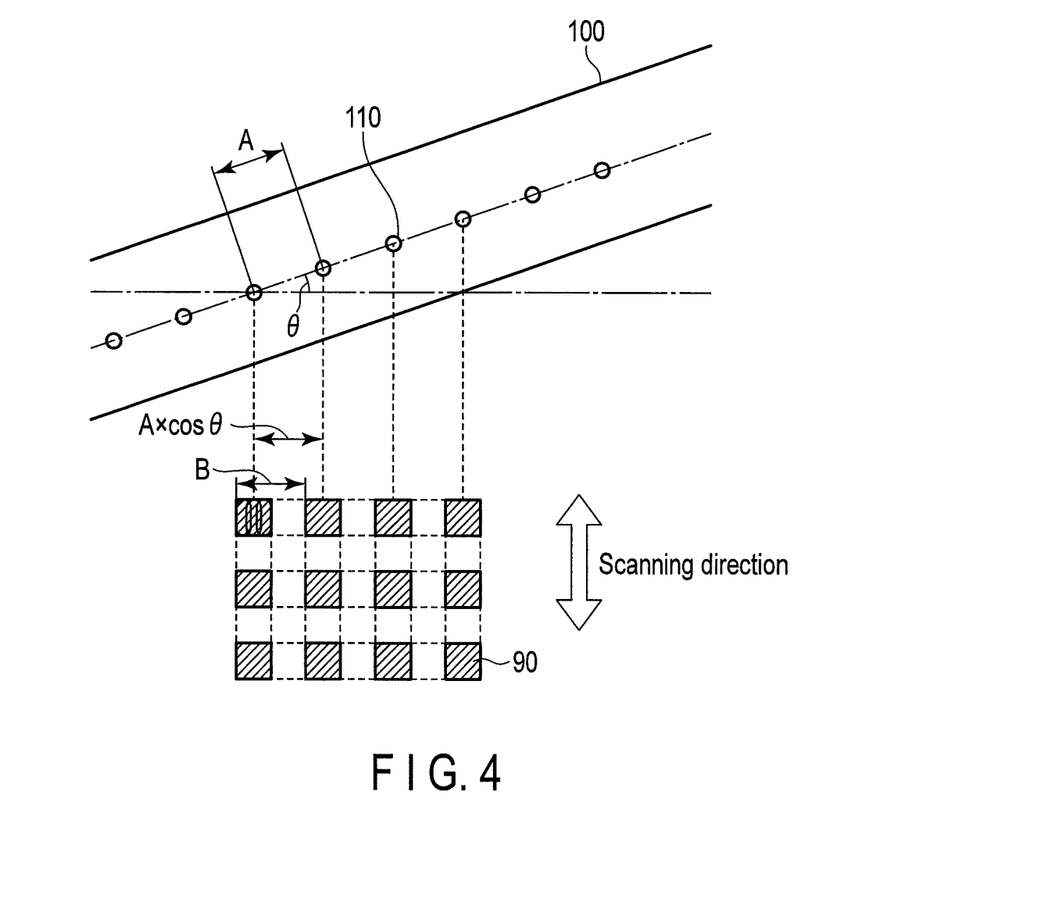
FIG. 4 is an explanatory view showing nozzle pitches when an inkjet head is tilted.

FIG. 4 shows an explanatory view showing nozzle pitches when an inkjet head is tilted.

The electronic paper substrate is caused to scan relatively by arranging nozzle holes 110 in an inkjet head nozzle surface 100, that is, a nozzle line of the inkjet head so as to be oriented in a direction toward the ink fixing layer. In this case, the inkjet head is arranged by being tilted such that a component perpendicular to the scanning direction of the inkjet head of nozzle intervals of the inkjet head is 1/integer a component perpendicular to the scanning direction of the inkjet head of distances between neighboring pixels to be colored in the same tint of the color electronic paper. That is, the line along which nozzles opened in the inkjet head are arranged as the arrangement of the inkjet head, that is, the axis of the nozzle arrangement is tilted at an arbitrary angle to the transport direction of the coated color electronic paper. By tilting the nozzle arrangement axis, the nozzle pitch can be adjusted. If the nozzle pitch when the axis is not tilted is A, the nozzle pitch when the axis is tilted at an angle θ is given by A×cos θ. When a pitch B between pixels to be colored in the same tint is fixed, θ can be determined by cos θ=B/A to adjust the nozzle pitch to the pitch.

If the pitch B is larger than the nozzle pitch A, θ may be determined by cos θ=B/2A by skipping one nozzle. A polyphase split driven inkjet head in which a plurality of phases with periodicity is driven by being split into each phase is used in an embodiment of the present invention and a process in which inkjet ink is supplied by being ejected from the nozzle in accordance with the position of the nozzle is performed by allocating one or more specific phases of the plurality of phases. In that case, the nozzle pitch of the same phase is assumed to be A. The inkjet head 10 performs a controlled ejection operation of minute drops by adjusting to the timing when the pixel colored region 91 passes below the nozzles. An inkjet head of independent nozzle control is used as another embodiment and an ejection operation is performed by adjusting the ejection timing of each nozzle to the speed in the scanning direction and the time.

In the method for manufacturing color electronic paper in the present invention, polyphase split driving can be adopted for the inkjet head, a plurality of phases with periodicity is allocated to a plurality of nozzles due to polyphase split driving, and a process in which inkjet ink is supplied by being ejected from the nozzles can be performed by limiting to partial specific phases of the plurality of phases. When an inkjet head capable of independent nozzle control is used, the number of phases is one and thus, all nozzles can be used. However, the type of head in the present invention should not be limited and can be used.

Figure 6:
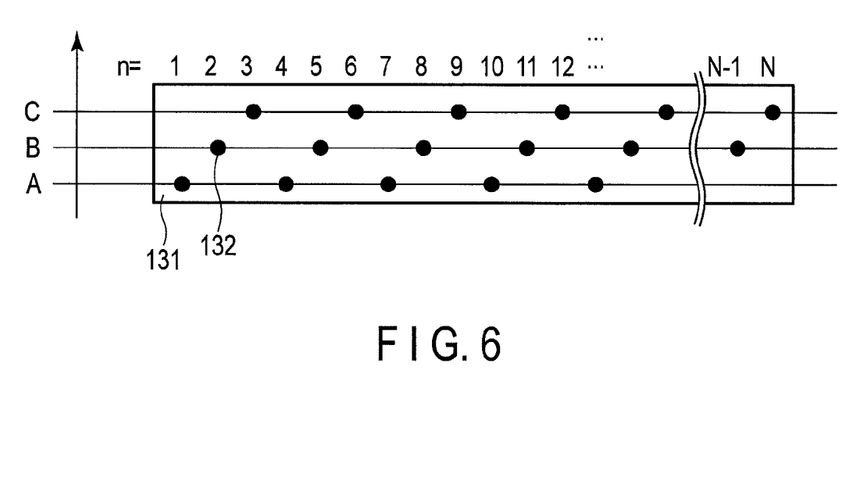
FIG. 6 is an explanatory view of polyphase split driving of the inkjet head.

FIG. 6 shows an explanatory view of polyphase split driving of the inkjet head in the present invention. FIG. 6 shows an example of an inkjet head 131 and a nozzle 132 arranged in the inkjet head 131. It is assumed that N nozzles are arranged in the inkjet head 131 and a number N of the natural number is attached like 1, 2, 3, . . . from the left end or the right end. Ink is ejected from each of the nozzles 132 and the timing of ejection of each nozzle, the number of times, and the amount of ejected ink can independently be controlled. Then, the nozzles are divided into the nozzles 1, 4, 7, . . . (N−2) of an A phase, the nozzles 2, 5, 8, . . . (N−1) of a B phase, and the nozzles 3, 6, 9, . . . N of a C phase along each line. The divided A phase, B phase, and C phase have periodicity. Here, for example, the nozzles 1, 4, 7, . . . (N−2) of the A phase are used to eject inkjet ink and no inkjet ink is ejected from the B and C phases. Accordingly, pressure and electric interference of neighboring nozzles can be shifted by time differences and thus, ejection is stabilized, the ejection timing can easily be controlled, and the coating can be applied with higher precision. The ejection of nozzles of the A phase, the B phase, and the C phase can be switched for each ejection or when poor ejection occurs in the A phase, the driving phase for ejection can be switched to the B phase or the C phase.

Materials of pixel ink (coloring ink) in the present invention uses, in addition to the coloring pigment, resin, dispersing agent, and solvent, a repellent agent. It is preferable to use three types of red, green, and blue as pigments of ink, but yellow, cyan, and magenta may also be used. In addition, the combination of colors is not limited.

Concrete examples of pigment used as coloring materials include Pigment Red 9, 19, 38, 43, 97, 122, 123, 144, 149, 166, 168, 177, 179, 180, 192, 215, 216, 208, 216, 217, 220, 223, 224, 226, 227, 228, 240, Pigment Blue 15, 15:6, 16, 22, 29, 60, 64, Pigment Green 7, 36, Pigment Red 20, 24, 86, 81, 83, 93, 108, 109, 110, 117, 125, 137, 138, 139, 147, 148, 153, 154, 166, 168, 185, Pigment Orange, 36, and Pigment Violet 23, but are not limited to the above examples. Further, two or more coloring materials may be mixed to obtain a desired hue.

As resins of materials of coloring ink, casein, gelatin, polyvinyl alcohol, carboxymethyl acetal, polyimide resin, acrylic resin, epoxy resin, melanin resin and the like are used and should be selected appropriately in relation to pigments.

When heat resistance or light resistance is needed, the acrylic resin is preferable.

The dispersing agent may be used to improve dispersion of pigment throughout the resin and as the dispersing agent, for example, polyoxyethylene alkyl ether can be cited as a nonionic surface active agent, for example, sodium alkylbenzenesulfonate, poly fatty acid salt, fatty acid salt alkyl phosphate, and tetraalkyl ammonium salt as an ionic surface active agent, and in addition, organic pigment derivatives and polyester can be cited.

One type of dispersing agent may be used alone or two types or more may be mixed and used.

As the type of solvent used for coloring ink, a solvent whose surface tension is in the surface tension range of 35 mN/m or less suitable for inkjet printing and whose boiling point is 130° C. or more is preferable. If the surface tension is 35 mN/m or more, stability of the dot shape during inkjet ejection is adversely affected profoundly and if the boiling point is 130° C. or less, the drying property near the nozzle becomes extremely high and, as a result, defects such as nozzle clogging occurs, which is not preferable. More specifically, 2-methoxyethanol, 2-ethoxyethanol, 2-butoxyethanol, 2-ethoxyethyl acetate, 2-butoxyethyl acetate, 2-methoxyethyl acetate, 2-ethoxyethyl ether, 2-(2-ethoxyethoxy) ethanol, 2-(2-butoxyethoxy) ethanol, 2-(2-ethoxyethoxy) ethyl acetate, 2-(2-butoxyethoxy)ethyl acetate, 2-phenoxy ethanol, and diethyleneglycol dimethyl ether can be cited, but the solvent is not limited to the above examples and any solvent satisfying the above requirements can be used. In addition, two types of solvents or more may be mixed and used if necessary.

As the repellent agent, silicon or fluorine materials can be cited as an example. More specifically, silicon resin or silicon rubber having organic silicon or alkylfluoro groups in the main chain or side chain and containing a siloxane component and preferably, a monomer containing fluorine or a polymer containing fluorine, for example, vinylidene fluoride, vinyl fluoride, and ethylene trifluoride or fluorine resin of copolymer thereof can be used. Among others, aliphatic polycarbonate containing fluorine is preferable from the viewpoint of the effect of the present invention. Examples of aliphatic polycarbonate containing fluorine include methacrylate polymer and perfluoropolyether containing fluorine. The repellent agent is preferably added in the ratio of 0.01 to 3.00 (% by weight) as the solid content ratio in the pixel ink. If the amount of addition is less than 0.01 (% by weight), the repellent effect is small and pixels are mixed and if the repellent agent is added by exceeding 3.00 (% by weight), the distance of the interface increases due to repellency between pixels, leading to a lower pixel occupancy rate.

After the ink fixing layer is coated with ink, the ink fixing layer is dried and set. One of the methods of heating, blast, pressure reduction, light irradiation, and electron beam irradiation or a combination of two methods or more may be used as a drying method and/or a setting method.

After the ink is dried and set, a protective film is formed to protect the color filter layer. To form a protective film of the color filter, polyamide, polyimide, polyurethane, polycarbonate, acrylic or silicon organic resin, or an inorganic film such as $Si_3N_4$, $SiO_2$, $SiO$, $Al_2O_3$, and $Ta_2O_3$ can be provided as a protective layer by the coating method of spin-coating, roll-coating, or printing method or the evaporation method.

EXAMPLE

As an example, a method of producing color electronic paper on which a color filter is printed in a matrix shape will be described.

Electronic paper using the microcapsule type electrophoretic method is produced. A display apparatus in this method forms an image by pouring positively/negatively charged white particles and black particles into a microcapsule filled with a transparent solvent and lifting respective particles to the display surface by applying an external voltage. The size of the microcapsule has a small diameter of a few tens of μm to a few hundred μm and thus, if the microcapsule is dispersed in a transparent binder, a coating of the microcapsule can be applied like ink. The ink can draw an image by applying a voltage from outside.

An active matrix display panel can be obtained by coating a transparent resin film in which a transparent electrode is formed with the electronic ink and pasting the transparent resin film and a substrate in which an electrode circuit for active matrix driving is formed together. Usually, a component in which a transparent resin film having a transparent electrode formed therein coated with electronic ink is called a "front plate" and a substrate having an electrode circuit for active matrix driving formed therein is called a "rear plate".

The ink fixing layer is provided on the front plate side. A mixture of urethane resin, toluene, water, and IPA is used as the material of the ink fixing layer and a coating is applied by a die coater such that the dry thickness thereof is 6 μm to 8 μm.

A grid-like pattern is printed on the ink fixing layer by an inkjet apparatus. The ink used for printing is prepared by mixing the pigment (3%), synthetic resin (20%), diethyleneglycol dimethyl ether (65%), PGM-Ac 11%, and aliphatic polycarbonate containing fluorine (1%). Methacrylate polymer containing fluorine is used as aliphatic polycarbonate containing fluorine.

A 3×3 droplet coating is applied so as to be contained in a pixel size of 120 μm per side as a printing pattern. The amount of one droplet is about 10 pl and printing is done such that the interval between droplets is 30 μm. Accordingly, the interval between pixels becomes 5 μm to 8 μm and the pixel coloring rate becomes about 90%.

After the color filter layer is dried at 80° C. for five min, a protective film is laminated to produce color electronic paper.

REFERENCE SIGNS LIST

1 . . . Substrate layer, 2 . . . Electrode layer, 3 . . . Bonding layer, 4 . . . Electrophoretic material layer, 5 . . . Optically transparent electrode layer, 6 . . . Electrode sheet layer, 7 . . . Ink fixing layer, 8 . . . Color filter layer, 9 . . . Protective film, 10 . . . Inkjet head, 11 . . . Inkjet head control base, 12 . . . Inkjet head maintenance apparatus, 20 . . . Electronic paper substrate, 30 . . . Transport stage, 40 . . . Coating apparatus, 50 . . . Drying unit, 60 . . . Inkjet head unit, 70 . . . Ink tank, 80 . . . Ink droplet impact portion, 90 . . . Pixel, 91 . . . Pixel colored region, 100 . . . Inkjet head nozzle surface, 110 . . . Inkjet head nozzle hole, 131 . . . Inkjet head (split driving type), 132 . . . Inkjet head nozzle (split driving type)

The invention claimed is:

1. Electronic paper in which an electrophoretic material layer, an optically transparent electrode layer, an ink fixing layer, and a color filter layer created by printing pixel ink on the ink fixing layer are stacked on an electrode substrate in this order,
wherein a repellent component is added to the pixel ink.

2. The electronic paper according to claim 1, wherein the color filter layer is formed by printing the pixel ink on the ink fixing layer by an inkjet method.

3. The electronic paper according to claim 1, wherein the repellent component is a monomer containing fluorine or a polymer containing fluorine.

4. The electronic paper according to claim 3, wherein the repellent component is aliphatic polycarbonate containing fluorine.

5. The electronic paper according to claim 1, wherein an interval between neighboring printed pixels printed on the ink fixing layer is 1 μm or more and 10 μm or less.

6. The electronic paper according to claim 1, wherein a coloring rate in a pixel of the printed pixel is 60% or more and 99% or less.

7. A method for manufacturing electronic paper, comprising:
stacking an electrophoretic material layer, an optically transparent electrode layer, and an ink fixing layer on an electrode substrate in this order; and
printing pixel ink on the ink fixing layer by an inkjet method to form a color filter layer,
wherein a repellent component is added to the pixel ink.

8. Electronic paper comprising an electrode substrate and, stacked on the electrode substrate in recited order:
an electrophoretic material layer;
an optically transparent electrode layer;
an ink fixing layer; and
a color filter layer comprising pixel ink printed on the ink fixing layer, the pixel ink having a repellent component mixed in the pixel ink.

9. The electronic paper according to claim 8, wherein the color filter layer is formed by printing the pixel ink on the ink fixing layer by an inkjet method.

10. The electronic paper according to claim 8, wherein the repellent component is a monomer containing fluorine or a polymer containing fluorine.

11. The electronic paper according to claim 10, wherein the repellent component is aliphatic polycarbonate containing fluorine.

12. The electronic paper according to claim 8, wherein an interval between neighboring printed pixels printed on the ink fixing layer is 1 μm or more and 10 μm or less.

13. The electronic paper according to claim 8, wherein a coloring rate in a pixel of the printed pixel is 60% or more and 99% or less.

* * * * *